TAPE-PLAYING APPARATUS

Filed Oct. 20, 1967 3 Sheets-Sheet 1

INVENTOR:
NOMAN LANE
BY Kurt Kelman
AGENT

Aug. 12, 1969 N. LANE 3,460,733

TAPE-PLAYING APPARATUS

Filed Oct. 20, 1967 3 Sheets-Sheet 2

INVENTOR:
NORMAN LANE
BY Kurt Kelman
AGENT

Aug. 12, 1969 | N. LANE | 3,460,733

TAPE-PLAYING APPARATUS

Filed Oct. 20, 1967 | 3 Sheets-Sheet 3

INVENTOR:

NORMAN LANE

BY Kurt Kelman

AGENT

United States Patent Office 3,460,733

Patented Aug. 12, 1969

3,460,733

TAPE-PLAYING APPARATUS

Norman Lane, Halesowen, England, assignor to BSR Limited, Old Hill, Stafford County, England, a British company Filed Oct. 20, 1967, Ser. No. 676,829
Int. Cl. B65h *17/20;* G11b *15/32*
U.S. Cl. 226—176 4 Claims

ABSTRACT OF THE DISCLOSURE

A magnetic tape-playing apparatus for use with tape provided in a removable cassette and in which movement of the tape is achieved by engagement with a capstan spindle, there being a transporter means releasably engageable with the cartridge to move the tape into and out of engagement with the capstan spindle, the cartridge being releasably engaged with the transporter means by means of a spring catch, which spring catch is held positively in engagement with the cartridge when the tape is engaged with the capstan spindle whilst the catch may be disengaged from the cartridge when the transporter means has moved the cartridge so that the tape is out of engagement with the capstan spindle.

BACKGROUND OF THE INVENTION

This invention relates to apparatus for reproducing sound from prerecorded magnetic tape of the kind in which the prerecorded tape is provided in a holder generally known as a cartridge or cassette, in which the tape is coiled on a reel mechanism in such manner that it can be uncoiled, transported past an opening in the cartridge or cassette and then recoiled within the cartridge or cassette. Such a loaded cartridge is used in playback apparatus in which, when the cartridge is introduced, the tape makes contact with the magnetic sound reproducing head as the tape is transported past the opening in the cartridge and the motion of the tape is obtained by means of a rotary driving member such as a spindle, generally known as a capstan spindle, which engages the outwardly presented face of the tape in cooperation with a rotary pressure roller or the like engaging the inwardly presented face of the tape, such rotary pressure roller being mounted within the cartridge. The capstan spindle is driven by a heavy flywheel, generally known as a capstan, which ensures that the capstan spindle rotates at a constant speed.

In order to ensure that the tape is gripped tightly between the capstan spindle and the rotary pressure roller it is necessary for the pressure roller mounted on the cartridge to be resiliently and strongly urged into contact with the capstan spindle. This has been achieved by transporting the cartridge between an operative position, wherein the tape is urged into contact with the capstan spindle, and an inoperative position wherein the tape is spaced from the capstan spindle by means of a relatively strong spring catch means with which the cartridge has to be engaged with on loading and disengaged from on unloading and, therefore, considerable force has to be overcome when loading a cartridge into and unloading a cartridge out of the tape-playing apparatus.

A tape-playing apparatus of the type described in the preceding paragraph will be referred to herein after as "of the type specified."

Tape-playing apparatus of the present kind is often used in motor vehicles where it is essential for the driver to be able to insert and withdraw a cartridge from the apparatus with the minimum of effort so that his concentration on driving is not interrupted.

Thus, the need to overcome the strong spring force, is a disadvantage of tape-playing apparatus of this kind and it is an object of the present invention to provide an improved tape-playing apparatus wherein this disadvantage is overcome.

SUMMARY OF THE INVENTION

According to the present invention in a tape-playing apparatus of the type described the spring catch means is biased by a relatively light spring towards a position engaging a recess in the cartridge and is movable between said operative position, in which the spring catch means is positively held by an abutment in engagement with the recess in the cartridge, and said inoperative position in which the spring catch means is free of the abutment so that manual unloading or loading of the cartridge from (or into the apparatus) can be effected manually against the action of the relatively light spring.

Preferably the abutment is provided by an L-shaped slot, groove or the like in a stationary casing part and one portion, the abutment portion, of the slot is disposed substantially parallel with the direction of movement of the cartridge into and out of the apparatus and a side of this abutment forms the abutment and the other portion, the release portion, is disposed at right angles to the abutment portion.

The spring catch means comprises an arm pivoted to the casing part in a manner such that the pivot is slidable substantially parallel with the direction of movement of the cartridge.

Conveniently, catch means is moved by a main slide plate formed with a fork disposed transversely to the direction of movement of said plate and parallel with the release portion of the slot and in the gap in the fork is located a peg or the like secured to the pivoted arm whereby the pivoted arm is moved by the main slide plate in a direction parallel with the direction of movement thereof.

BRIEF DESCRIPTION OF THE DRAWINGS

A tape-playing apparatus constructed according to the present invention will now be described in more detail by way of example with reference to the accompanying drawings wherein.

DESCRIPTION OF THE PREFERRED EMBODIMENT

In order to avoid unnecessary prolix description only the construction of the transporter means and its associated parts will be described in detail herein, other parts of the tape-playing apparatus merely being mentioned briefly so that the invention may be fully understood, it being appreciated that these other parts of the apparatus do not form part of the present invention.

Figure 1:
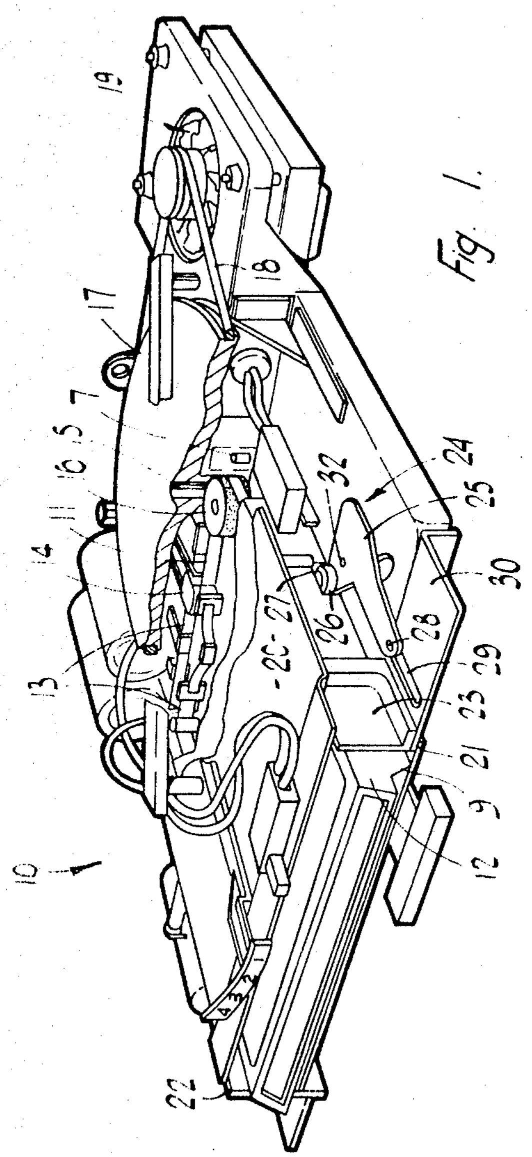
FIGURE 1 is a perspective view of a tape-playing apparatus embodying the invention with the outer casing removed, and with part broken away and taken from above, the front and to one side.
Figure 2:
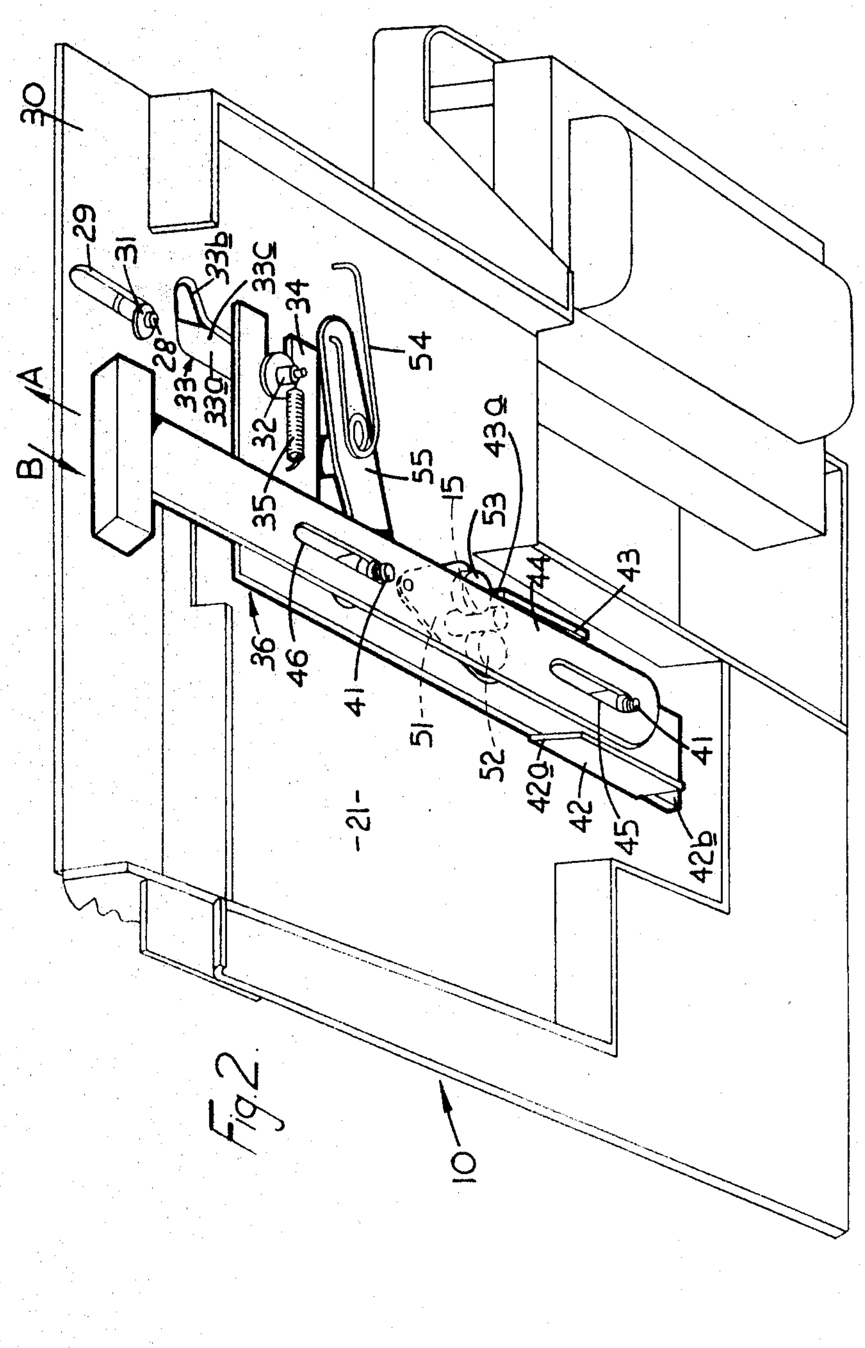
FIGURE 2 is another perspective view of the apparatus of FIGURE 1 taken from below, the front and to the other side.

The tape-player is illustrated generally at 10 in FIGURES 1 and 2 and comprises a pre-recorded tape 11 provided in a holder 12 generally known as a cartridge, in which the tape is coiled on a reel mechanism, not shown, transported past openings 13 in the cartridge 12 and then recoiled within the cartridge. The cartridge is arranged to be slidably loaded into a cartridge receiving cavity 9 in the apparatus 10 and suitable catch means are provided to hold the cartridge 12 in position and to resiliently urge it inwardly of the apparatus 10. When the cartridge 12 has been loaded into the apparatus 10 it is engaged with the transporter means which moves it between its inoperative position and an operative position wherein the cartridge 12 is urged strongly and resiliently inwardly of the apparatus so that the tape 11 makes contact with a magnetic sound reproducer head 14 as the tape is transported past the opening 13 in the cartridge 12 and the motion of the tape is derived from a capstan spindle 15 against which the outwardly presented face of the tape 11 is resiliently urged by means of a rotary pressure roller 16 which is engaged with the inwardly presented face of the tape, which pressure roller is mounted permanently within the cartridge 12. The capstan spindle 15 is rotatably mounted in the apparatus 10 on bearings, not shown, and is non-rotatably connected to a heavy flywheel or capstan 17 which is driven by a flexible band 18 from an electric motor 19.

The above description forms a very brief description of a cartridge type of a tape-playing apparatus to which the present invention is applied and the features which provide the present invention will now be described in more detail.

The cartridge receiving cavity 9 is of generally rectangular parallelopiped shape and has opposed, spaced apart, top and bottom walls 20 and 21, a side wall 22 extending normally therebetween at one side thereof, and an apertured opposite side wall 23. The side wall 22 is provided with three rollers, not shown, rotatable about a vertical axis and arranged to engage with one side of the cartridge 12 when it is loaded into the apparatus. The top and bottom walls 20 and 21 also engage the cartridge 12 but are not provided with rollers. An abutment stud 7 carried by a main slide plate, hereinafter to be described, projects into the cavity 9 adjacent its inner end through a slot in the bottom wall 21 and is arranged to abut against the apertured end wall of the cartridge 12. A catch means 24, comprising a bell crank lever 25 having a roller 26 mounted at the free end of one limb thereof is mounted on the apparatus so that the roller 26 projects through an aperture in the wall 23 and engages with the conventional V-shaped recess 27 in the side of the cartridge 12, whilst the other limb of the lever 25 lies generally parallel to the side of the cavity 9. The roller 26 of bell crank lever 25, as hereinafter to be explained, resiliently engages the cartridge 12 and tends to urge the cartridge 12 towards the wall 23 and it is for this reason that the rollers are provided so that the cartridge 12 slides easily within its cavity.

At the free end of the other limb of the lever 25 there is provided a downwardly depending pin 28 which passes through a narrow slot 29 formed in a fixed part 30 of the apparatus and which extends parallel to the side walls 22, 23 of the cartridge receiving cavity 9. A circlip 31, see FIGURE 2, is engaged in a groove in the pin 28 to hold the lever 25 in position.

At the junction between the two arms of the bell crank lever 25 a further downwardly depending pin 32 is provided which projects through a further slot 33. The part of the pin 32 projecting through the slot 33 is engaged between the arms of a fork member 34 and a coil tension spring 35 is connected between the pin 32 and the member 34 to urge the pin 32 into engagement with the base of the fork member. The slot 33 includes a first, abutment portion **33*a* which extends parallel to the side walls 22, 23 of the cartridge receiving cavity 9 open and a second, release portion 33*b* which extends generally perpendicular away from the adjacent side wall 22**.

The fork member 34 is formed integrally with a main slide plate 36, as hereinafter to be described, and as the main slide plate moves back and forth parallel to the sides 23, 22 between its operative and inoperative positions then the fork member 34 will cause the bell crank lever 25 to also slide back and forth and as the roller 26 thereof is engaged with the recess 27 of the cartridge 12 the cartridge will also be moved back and forth between its operative and inoperative positions.

When the main slide plate 36 is in the inoperative position, i.e., is closest to the front of the cartridge receiving cavity 9 the pin 32 is aligned with the release part **33*b* of the slot and so the bell crank lever 25 can pivot about the pin 28 and so the roller 26 can move laterally out of the recess 27 to enable a cartridge to be unloaded from or loaded into the apparatus. When the main slide plate 26 is moved inwardly of the apparatus to the operative position the pin 32 is prevented from outward lateral movement away from the recess 27 by engagement with an abutment edge 33*c* of the abutment part 33*a* of the slot 33 and so the roller 26 is seld positively within the recess 27**.

The catch means 24 serves only to hold the cartridge 12 relative to the main slide plate 26 and does not itself move the cartridge 12 between its operative and inoperative positions and so does not require any considerable spring pressure. The strength of the spring 35 needs only to be sufficient to urge the roller 26 into the recess 27, the roller 26 being held within the recess 27 by virtue of engagement with the side **33*c* of the slot 33, and thus very little spring pressure has to be overcome to enable the cartridge 12 to be loaded into, or unloaded from, the apparatus 10. The effort required to move the cartridge between its inoperative position and its operative position, wherein the tape is urged strongly against the capstan spindle, is provided by the movement of the main slide plate 36** which is communicated to the cartridge by the catch means.

The main slide plate 36 which provides the transporter means of the present invention will now be described, referring particularly to FIGURES 2 and 3.

Figure 3:
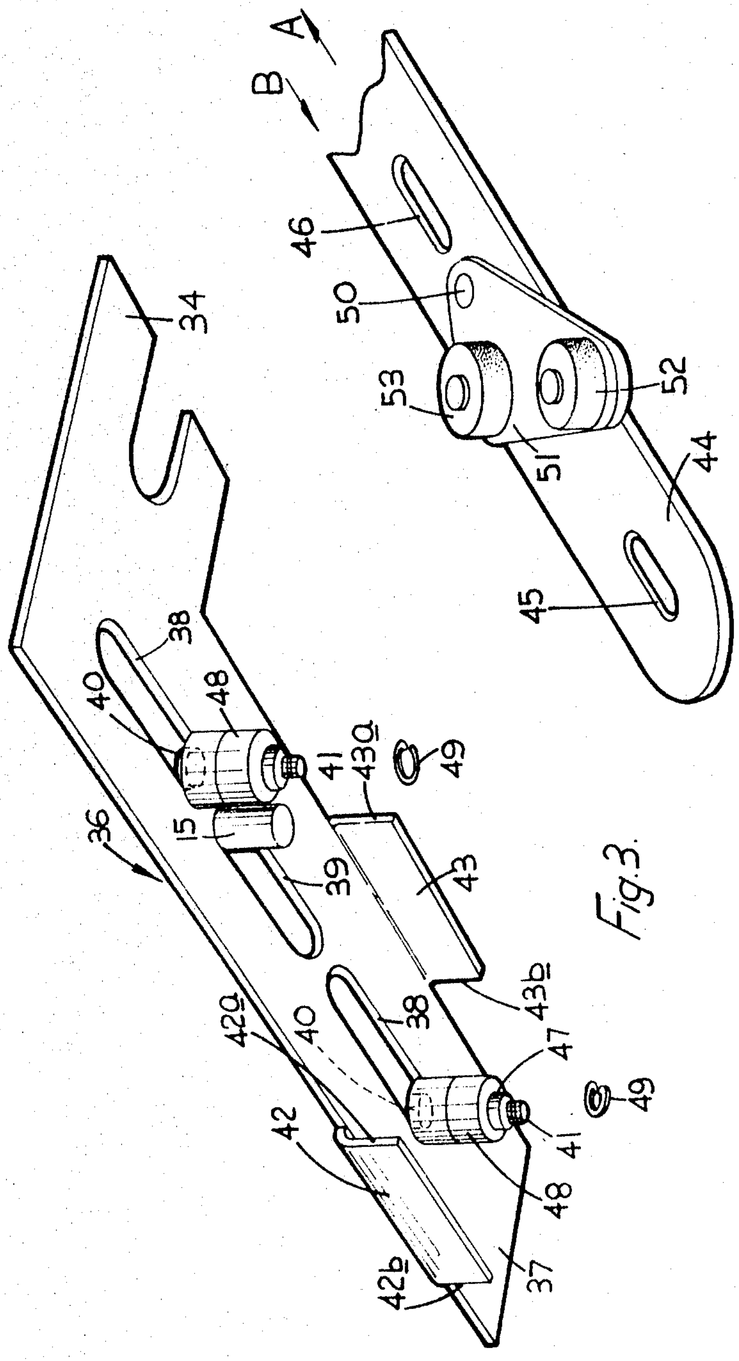
FIGURE 3 is a detailed exploded perspective view of the main slide plate.

The main slide plate 36, shown in FIGURE 3, is generally L-shaped in plan view and the shorter limb of the L provides the fork member 34. The main slide plate 36 is arranged to slide on the frame of the tape playing apparatus beneath the bottom 21 of the cartridge receiving cavity 9 with its longer limb 37 extending in the direction of movement of the cartridge 12.

The longer limb 37 of the main slide plate is provided with three coaxial elongated slots 38 and 39, the two end slots 38 being provided to accommodate two rollers 40 provided on the spindles 41 secured to the underside of the bottom wall 21 of the cartridge receiving cavity 9 to ensure that the main slide plate 36 slides in the longitudinal direction of the cavity 9, i.e., in the direction of introduction and removal of the cartridge 12. The central slot 39, of the three slots, is sufficiently wide to accommodate, with clearance, the lower end of the capstan spindle 15.

The longer limb 37 on each side thereof is provided with upstanding flanged portions 42, 43 and these flanged portions are of limited extent and do not extend along the whole length of each side and they are staggered longitudinally so that the end **42*a* of the flange portion 42 on one side is roughly in line with the centre point of the flange portion 43 on the other side of the longer limb 37**.

An actuating slide 44, generally rectangular in plan view, and provided with two elongated slots 45, 46 is slidably mounted on the spindles 41 at a position spaced slightly above the main slide plate 36 by means of guide rollers 47 mounted on the spindles 41 and engaged within the slots 45, 46, there being collar members 48 positioned around the spindles 41 between the main slide plate 36 and the actuating slide 44. Circlips 49 are provided on the spindles 41 below the actuating slide 44 to maintain it in position on the spindles 41. Between the two slots 45, 46 in the actuating slide 44 and co-axial therewith at a position spaced slightly away from the inner end of the slot 46 which is closest to the opening of the cartridge recess there is provided a pivot pin 50 for a pulley carrier plate 51.

The pulley carrier plate 51 is of generally triangular form, the pivot pin 50 being provided adjacent one apex of the triangle and rubber pulleys 52, 53 are rotatably mounted at the other two apices thereof, the pulleys 52, 53 is arranged so that the actuating slide 44 is moved to and fro in its longitudinal direction the rubber pulleys 52, 53 are moved past the capstan spindle 15 and when the one pulley 52, 53 is in engagement with the capstan spindle 15 the other pulley 52, 53 is just out of engagement therewith. The diameter of the pulleys 52, 53 is also chosen so that when a pulley 52, 53 is in engagement with the capstan spindle 15 the flange member 43 or 42 respectively formed on the main slide plate 36 is also engaged by the pulley 52, 53 on the opposite side thereof as is engaged by the capstan spindle 15.

A toggle spring 54 of conventional shape to provide an "over dead-centre action" is provided between the body of the tape-playing apparatus 10 and one end of a pivoted lever 55 which is pivotally connected at its other end to the main slide plate 36 so that the main slide plate 36 is urged either towards or away from the capstan spindle by the toggle spring 54. The drive provided by the capstan spindle 15 through the rubber pulleys 52, 53 being provided to move the main slide plate 36 over the dead-centre position of the toggle spring 54.

In use, assuming that the cartridge is in its operative position, the actuating member 44 is moved in its longitudinal direction towards the outside of the apparatus, i.e., in the direction of the arrow A, and this causes the rubber pulley 52 to be moved into engagement with the capstan spindle 15 and, assuming that the capstan spindle is rotated clockwise in FIGURE 2, then the rubber pulley 52 would be rotated anticlockwise, and hence the left-hand edge of the pulley, as seen in FIGURE 2, will be moving in a direction from the front to the middle of the apparatus. In addition, as the actuating member 44 is moved as described above, it causes the above mentioned rubber pulley 53 to engage with the one end 42*b* of the upturned flange 42 and thus as the pulley 52 is rotated anticlockwise this will cause the flange 42 which is engaged with the pulley 52 to be moved in the direction to move the cartridge 12 into contact with the capstan spindle 15, i.e., in its operative position. FIGURE 2 shows the main slide plate at this stage.

When the main slide plate 36 has been moved until the trailing end 42*a* of the flange 42 moves out of engagement with the pulley 52 the toggle spring 54, having been thus moved over its dead-centre position, continues to move the main slide plate 36 and hence the pressure roller 16 carried by the cartridge 12 is forced resiliently into engagement with the capstan spindle 15 whilst the roller 52 is disengaged from the capstan spindle 15.

When it is desired to move the cartridge to its inoperative position and hence remove the pressure roller 16 of the cartridge 12 out of engagement with the capstan spindle 15, the actuating slide 44 is pushed inwardly in the direction of the arrow B, so that the pulley 53 is moved into engagement with the capstan spindle 15 and hence is rotated anticlockwise, and is also moved into engagement with the end 43*a* of the flange 43 on the main slide plate 36 and thus the main slide plate 36 is driven in the direction to remove the pressure roller 16 of the cartridge 12 out of engagement with the capstan spindle 15.

The pivotal mounting of the pulley carrier 51 on the spindle 50, allows slight sideways movement of the pulleys 52, 53 which ensures that a good contact is achieved with the capstan spindle 15 and with the flange 42 or 43 since the pulley 52 or 53 "float" between the capstan spindle 15 and its associated flange 42 or 43, and a grab effect on the pulleys 52, 52 is achieved so that each pulley is tended to be pulled between the capstan spindle 15 and its associated flange 42 or 43.

It will, therefore, be appreciated that the capstan, through the capstan spindle 17, is only providing drive for the cartridge for a short distance whilst the cartridge is moved up to and sent past the dead-centre position of the toggle spring 54. The capstan being completely free from driving the cartridge when the cartridge is in its operative and inoperative positions.

It will also be appreciated that, if desired, only one of the rubber pulley 52 or 53 may be provided if it is only desired that a drive be used to move the cartridge in one direction. For example, it is relatively easy to load the cartridge manually into the cavity 9 to firstly engage it with the catch means 24 and then to move the cartridge and main slide plate over the "dead-centre position" of the toggle spring 54 into the operative position of the cartridge. It is, however, considerably more difficult to withdraw the cartridge from this operative position, as there is no convenient portion of the cartridge to grip, manually, and it would be necessary to provide the drive above mentioned to move the main slide plate from the operative to the inoperative position and in this case only the roller 52 would be provided.

I claim:

1. In a magnetic tape-playing apparatus for tape provided as an endless loop in a cartridge and including a magnetic transducer head engageable with the tape, a capstan spindle engageable with the tape to provide the drive to the tape to transport the tape past the magnetic transducer head, spring catch means releasably engageable with the cartridge, the improvement wherein the catch means transports the cartridge between an operative position wherein the tape is urged into contact with the capstan spindle, and an inoperative position wherein the tape is spaced from the capstan spindle and wherein catch means is biased by a relatively light spring towards a position engaging a recess in the cartridge and is movable between said operative position, in which the spring catch means is positively held in engagement with the recess in the cartridge, by an abutment, and said inoperative position in which the spring catch means is free of the abutment so that the manual unloading (or loading) of the cartridge from (or into the apparatus) can be effected manually against the action of the relatively light spring.

2. The improvement according to claim 1, wherein the abutment is provided by an L-shaped slot or groove in a stationary casing part and one portion, the abutment portion, of the slot is disposed substantially parallel with the direction of movement of the cartridge into and out of the apparatus and a side of this abutment portion forms the abutment and the other portion, the release portion, is disposed at right angles to the abutment portion.

3. The improvement according to claim 2, wherein the spring catch means comprises an arm pivoted to the casing part in a manner such that the pivot is slidable substantially parallel with the direction of movement of the cartridge.

4. The improvement according to claim 3, wherein the catch means is moved by a main slide plate formed with a fork disposed transversely to the direction of movement of said plate and parallel with the release portion of the slot and in the gap in the fork is located a peg or the like secured to the pivoted arm whereby the pivoted arm is moved by the main slide plate in a direction parallel with the direction of movement thereof.

References Cited

UNITED STATES PATENTS

| | | | |
|---|---|---|---|
| 3,343,687 | 9/1967 | Deighton et al. | 242—55.13 X |
| 3,372,884 | 3/1968 | Nagano. | |
| 3,395,871 | 8/1968 | Ackermann et al. | 242—55.13 |

ALLEN N. KNOWLES, Primary Examiner

U.S. Cl. X.R.

242—55